(12) United States Patent
Owens

(10) Patent No.: US 10,718,388 B1
(45) Date of Patent: Jul. 21, 2020

(54) UNI-DRIVE PULLEY

(71) Applicant: Kevin M. Owens, Tampa, FL (US)

(72) Inventor: Kevin M. Owens, Tampa, FL (US)

( * ) Notice: Subject to any disclaimer, the term of this patent is extended or adjusted under 35 U.S.C. 154(b) by 115 days.

(21) Appl. No.: 16/140,734

(22) Filed: Sep. 25, 2018

Related U.S. Application Data

(60) Provisional application No. 62/562,781, filed on Sep. 25, 2017.

(51) Int. Cl.
  *F16D 41/28* (2006.01)
  *F16H 55/17* (2006.01)
  *F16D 41/08* (2006.01)
  *F16D 41/06* (2006.01)

(52) U.S. Cl.
  CPC ............ *F16D 41/28* (2013.01); *F16D 41/08* (2013.01); *F16H 55/171* (2013.01); *F16D 2041/0603* (2013.01)

(58) Field of Classification Search
  None
  See application file for complete search history.

(56) References Cited

U.S. PATENT DOCUMENTS

| | | | | |
|---|---|---|---|---|
| 4,722,722 A * | 2/1988 | Rampe | ................... | F16H 7/023 474/161 |
| 5,310,383 A * | 5/1994 | Lisi | ........................ | B62M 9/06 474/95 |
| 5,415,592 A * | 5/1995 | Hoyt | ....................... | F16H 7/023 474/141 |
| 5,417,617 A * | 5/1995 | Milton | .................. | F16H 55/171 474/205 |
| 5,890,980 A * | 4/1999 | Heyng | ..................... | B62L 1/00 180/219 |
| 7,101,296 B1 * | 9/2006 | Cass | ........................ | B62M 7/02 474/148 |
| 2012/0172165 A1 * | 7/2012 | Schroedl | .................. | B62M 9/02 474/160 |
| 2017/0314665 A1 * | 11/2017 | Garcia | .................... | F16H 55/30 |

* cited by examiner

*Primary Examiner* — Colby M Hansen
(74) *Attorney, Agent, or Firm* — Frijouf, Rust & Pyle, P.A.

(57) ABSTRACT

An improved rear pulley for a rear wheel vehicle having a flexible drive belt. The improved rear pulley has a pulley ring that includes pulley teeth for gripping the flexible drive belt, and a pulley ring wall that extends inwardly from the pulley ring. The pulley ring contains sides for maintain the flexible drive belt on the pulley teeth. The improved rear pulley has an outer hub that has an exterior and an interior outer hub surface. The interior outer hub surface has a first, a second and a third interior outer hub face. The exterior outer hub surface has an outer hub wall that extends outwardly. The improved rear pulley has an inner hub that includes an exterior and an interior inner hub surface. The improved rear pulley has bearings and a sprag clutch for allowing rotation and directional rotation, respectively, of the outer hub about the inner hub.

21 Claims, 13 Drawing Sheets

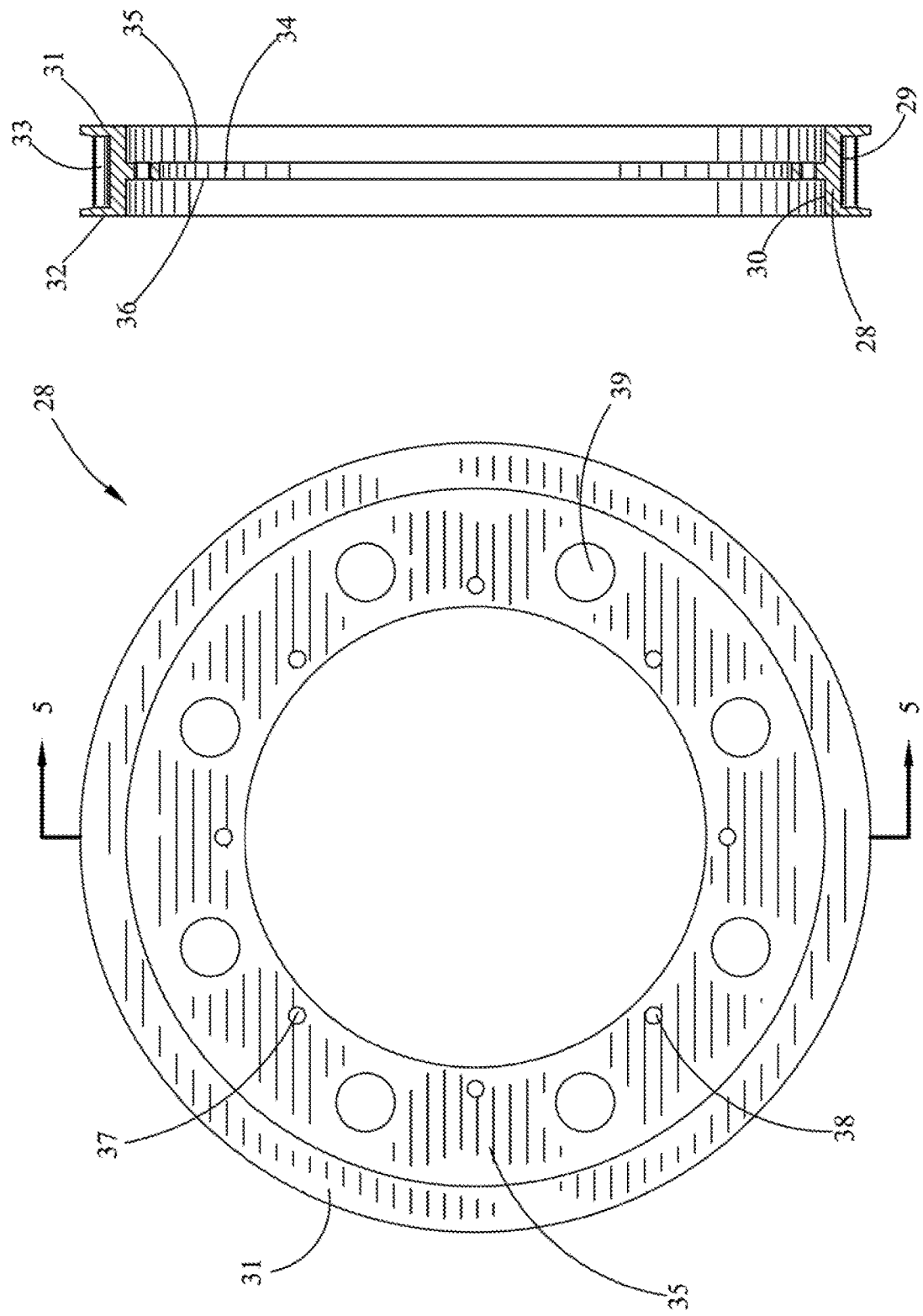

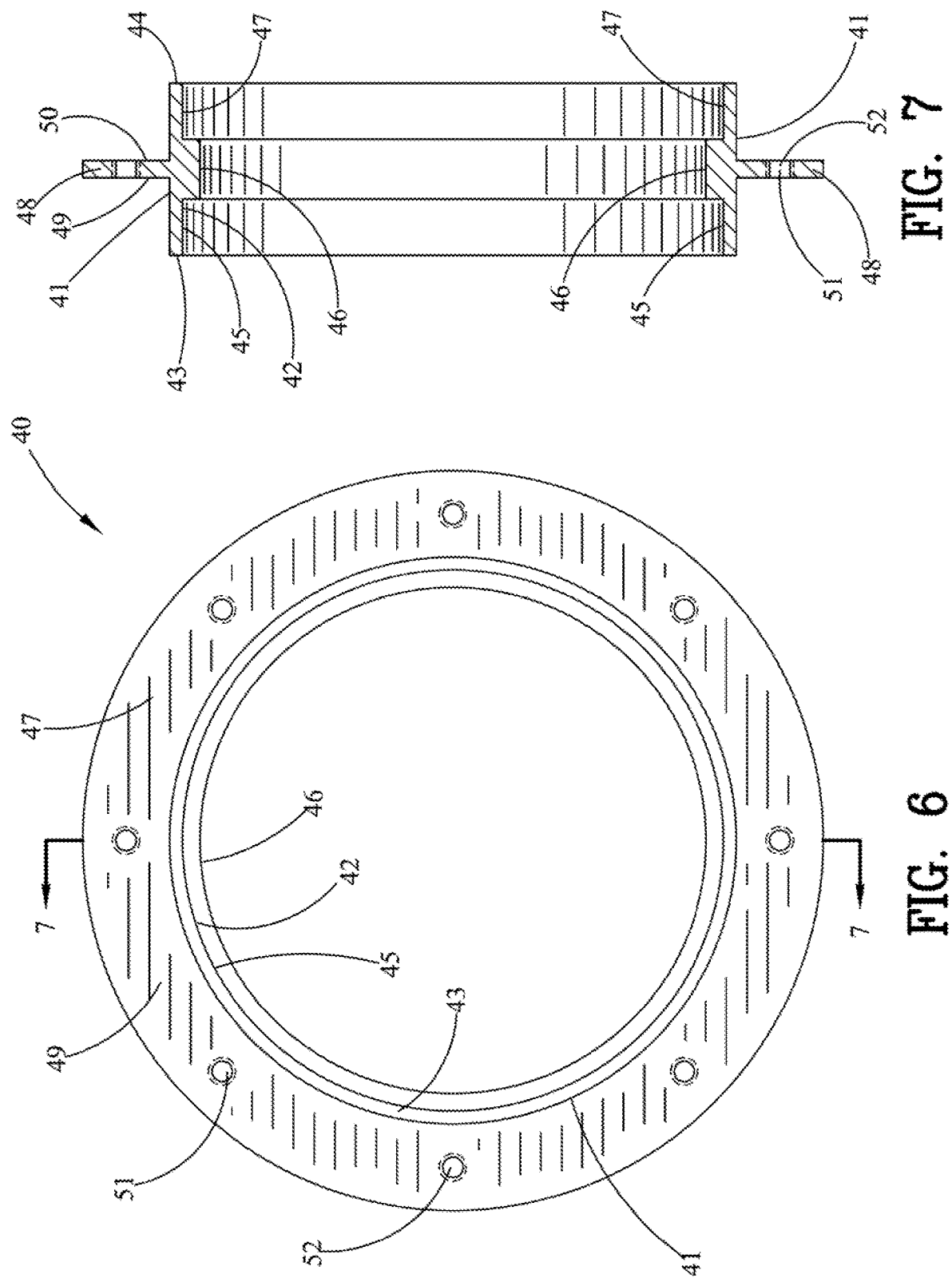

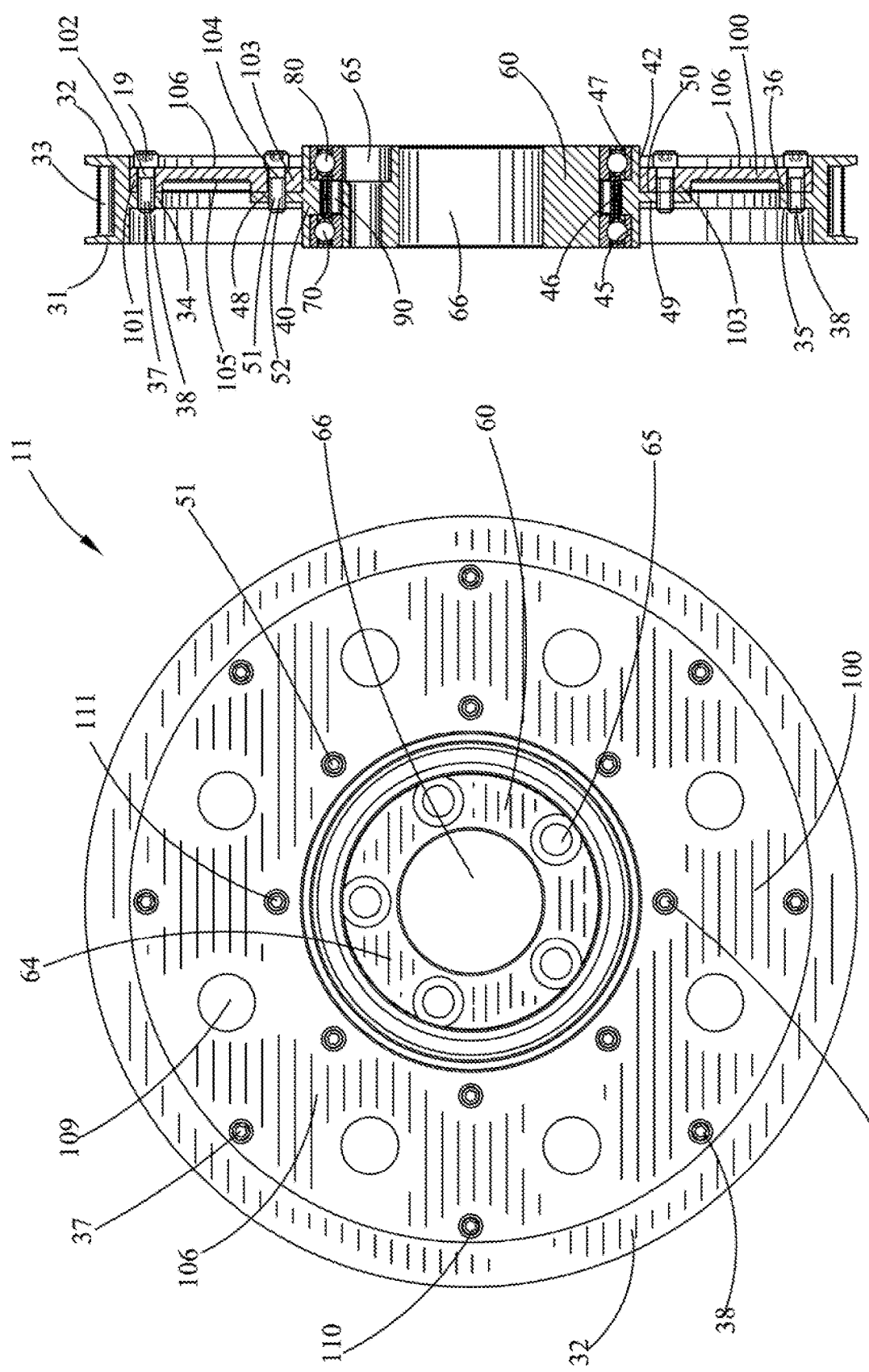

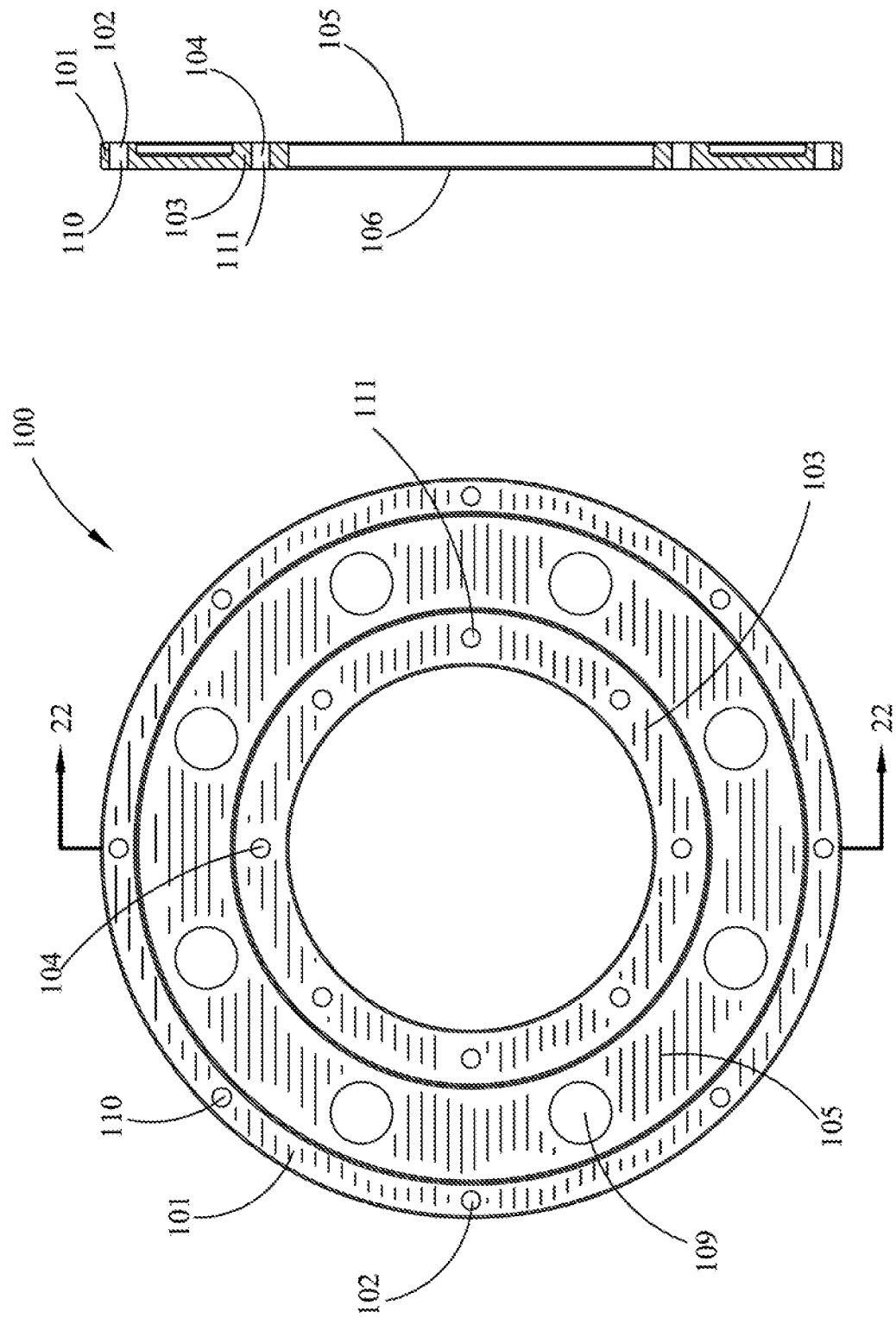

UNI-DRIVE PULLEY

CROSS-REFERENCE TO RELATED APPLICATIONS

This application claims benefit of U.S. Patent Provisional application No. 62/562,781 filed Sep. 25, 2017. All subject matter set forth in provisional application No. 62/562,781 is hereby incorporated by reference into the present application as if fully set forth herein.

BACKGROUND OF THE INVENTION

Field of the Invention

This invention relates to drive pulley and more particularly to a drive pulley on a rear wheel drive vehicle.

Description of the Related Art

All terrain vehicles and motorcycles have been common place in the world for over a century. Engineers to hobbyists have mounted steam engines and then later the internal combustion engine on bicycles. Bicycles with mounted engines were then and now commonly known as a motorcycle. Motorcycles have been around before the 1900s and since that time many improvements have been made from its original conception. Today, motorcycles have especially become popular with the rise of fuel prices.

Motorcycles, today, typically have a front and a rear wheel and the rear wheel is driven by an internal combustion engine. The internal combustion engine drives a manual transmission that in turn rotates the rear wheel and propels the motorcycle. The speed of the motorcycle is controlled by the operator by which the operator selects both the rotations per minute (RPM) of the internal combustion engine and select the appropriate gear for the speed of the motorcycle.

When the motorcycle's engine is running, the engine spins the input shaft of the transmission. While the motorcycle's transmission is in neutral, the motorcycle will not move under its own power. In order for the operator to set the motorcycle in motion, the operator must select a gear by shifting from neutral to first. To shift from neutral to first the operator must squeeze the hand lever located on the left handlebar which disengages the clutch and thereby disengaging the engine from the transmission. While the transmission is disengaged from the engine, the transmission gears will stop spinning and allow the operator to shift to first or the desired gear. Once the transmission is in the desired gear, the operator will simultaneously increase the power of the engine and engage the clutch by slowly releasing the pressure on the hand lever.

After the motorcycle is in motion and increasing in speed, the operator must shift to a higher gear to prevent the engine's RPM from getting excessively high. In order for the operator to shift to a higher gear, the operator must slightly decrease power to the engine, disengage the clutch by squeezing the hand lever then using his left foot shift to the new gear. After the new gear has been selected the operator must then release the pressure on the hand lever thereby engaging the clutch and then reapply power to the engine.

If the operator wants to then operate the motorcycle at a slower speed the operator must again slightly decrease power to the engine, disengage the clutch by squeezing the hand lever then using his left foot, shift to the new lower gear. After the new lower gear has been selected the operator must then release the pressure on the hand lever thereby engaging the clutch and reapply the appropriate power to the engine.

Although this current method of shifting gears is reliable and customary, the current shifting method can be exhausting, especially in high traffic, and requires the operator to use both hand while riding. The current method of shifting is also challenging when the operator wants to make a rapid yet smooth shift from low to higher speeds while maintaining positive control. In addition, motorcycles are acceptable to rear wheel hop, chatter or even the loss of traction if the operator reduces power to the engine without disengaging the clutch.

There have been many in the prior art who have attempted to solve these problems with varying degrees of success. None, however completely satisfies the requirements for a complete solution to the aforestated problem.

Various other systems have been developed in an attempt to solve this problem, however none has been able to completely answer the need for a safe and non-taxing ride while providing a smoothing shifting experience from low to higher gears and speeds.

Therefore, it is an object of the present invention to provide a smoother shifting experience from low to higher gears and speeds.

Another object of this invention is to relieve the operator from the exhausting and repetition of disengaging and engaging the clutch using the hand lever.

Another object of this invention is to provide a safer ride to the operator and passengers.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly, other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved rear pulley for a rear wheel driven motor vehicle. The rear wheel driven motor vehicle has an engine pulley that is connected to and turns a rear pulley by the use of a flexible drive belt. The rear pulley is bolted to the rear wheel of the rear wheel driven motor vehicle and a rear axle secures the rear wheel to the rear wheel driven motor vehicle.

The improved rear pulley enhances safety, relieves the operator from the exhausting and repetition of engaging and disengaging the clutch and provides a smoother shifting experience from low to higher gears and speeds. The improved rear pulley comprises a pulley ring, an outer hub, an inner hub, bearings and a sprag clutch.

The pulley ring has an exterior pulley ring surface, an interior pulley ring surface, a first pulley ring side surface and a second pulley ring side surface.

The exterior pulley ring surface contains pulley teeth that extend outwardly for gripping the flexible drive belt. The flexible drive belt can be a rubber belt, a chain belt or the sort. The pulley ring has a wall that is affixed to and extending inwardly and perpendicularly to the interior pulley ring surface. The pulley ring contains a first and a second side surface. The first pulley ring side surface and said second pulley ring side surface extends outwardly and beyond the pulley teeth for maintaining the flexible drive belt on top of the pulley teeth.

The outer hub has an exterior outer hub surface, an interior outer hub surface, a first outer hub side surface and a second outer hub side surface. The interior outer hub surface has a first interior outer hub face, a second interior outer hub face and a third interior outer hub face. The outer hub has an outer hub wall which is affixed to and extends outwardly and perpendicularly from the exterior outer hub surface for fastening the outer hub wall to the pulley ring wall. The outer hub wall contains a first side surface and a second side surface.

The inner hub has an exterior inner hub surface, an interior inner hub surface, a first inner hub side surface and a second inner hub side surface. The inner hub has a center inner hub aperture for encompassing the rear axle. The inner hub also has a plurality of mounting apertures that extend from the first inner hub side surface to the second inner hub side surface for the passage of a bolt to secure the inner hub to the wheel.

The improved rear pulley has a first bearing and a second bearing that are located between the outer hub and the inner hub for allowing the rotation of the outer hub about the inner hub. More precisely, the first bearing is located between the first interior outer hub face and the inner hub and the second bearing is located between the third interior outer hub face and the inner hub.

The improved rear pulley also contains a sprag clutch that is located between the second interior outer hub face and the exterior inner hub surface for allowing one directional rotation of the outer hub about the inner hub.

In another embodiment of the improved rear pulley, the improved rear pulley includes a wheel plate. The wheel plate has an exterior wheel plate end, an interior wheel plate end, a first wheel plate side surface and a second wheel plate side surface. The exterior wheel plate end has a plurality of wheel plate mounting fasteners for fastening the exterior wheel plate end to the inner pulley ring wall, while the interior wheel plate end has a plurality of wheel plate mounting fasteners for fastening the interior wheel plate end to the outer hub wall.

The foregoing has outlined rather broadly the more pertinent and important features of the present invention in order that the detailed description that follows may be better understood so that the present contribution to the an can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims

BRIEF DESCRIPTION OF THE DRAWINGS

For a fuller understanding of the nature and objects of the invention, reference should be made to the following detailed description taken in connection with the accompanying drawings in which: For a fuller understanding of the nature and objects of the invention, reference should be made to the following detailed description taken in connection with the accompanying drawings in which:

FIG. 4 is a side view of the rear pulley ring shown in FIG. 2 and FIG. 3;

FIG. 5 is a sectional view along line 5-5 in FIG. 4;

FIG. 6 is a side view of the outer pulley;

FIG. 7 is a sectional view along line 7-7 in FIG. 6;

FIG. 17 is the second side view of the second embodiment showing the improved rear pulley with a rear pulley plate;

FIG. 18 is a sectional view along line 18-18 in FIG. 14;

FIG. 21 is the first side view of the rear pulley plate;

FIG. 22 is a sectional view along line 22-22 in FIG. 21;

Similar reference characters refer to similar parts throughout the several Figures of the drawings.

DETAILED DISCUSSION

Figure 1:
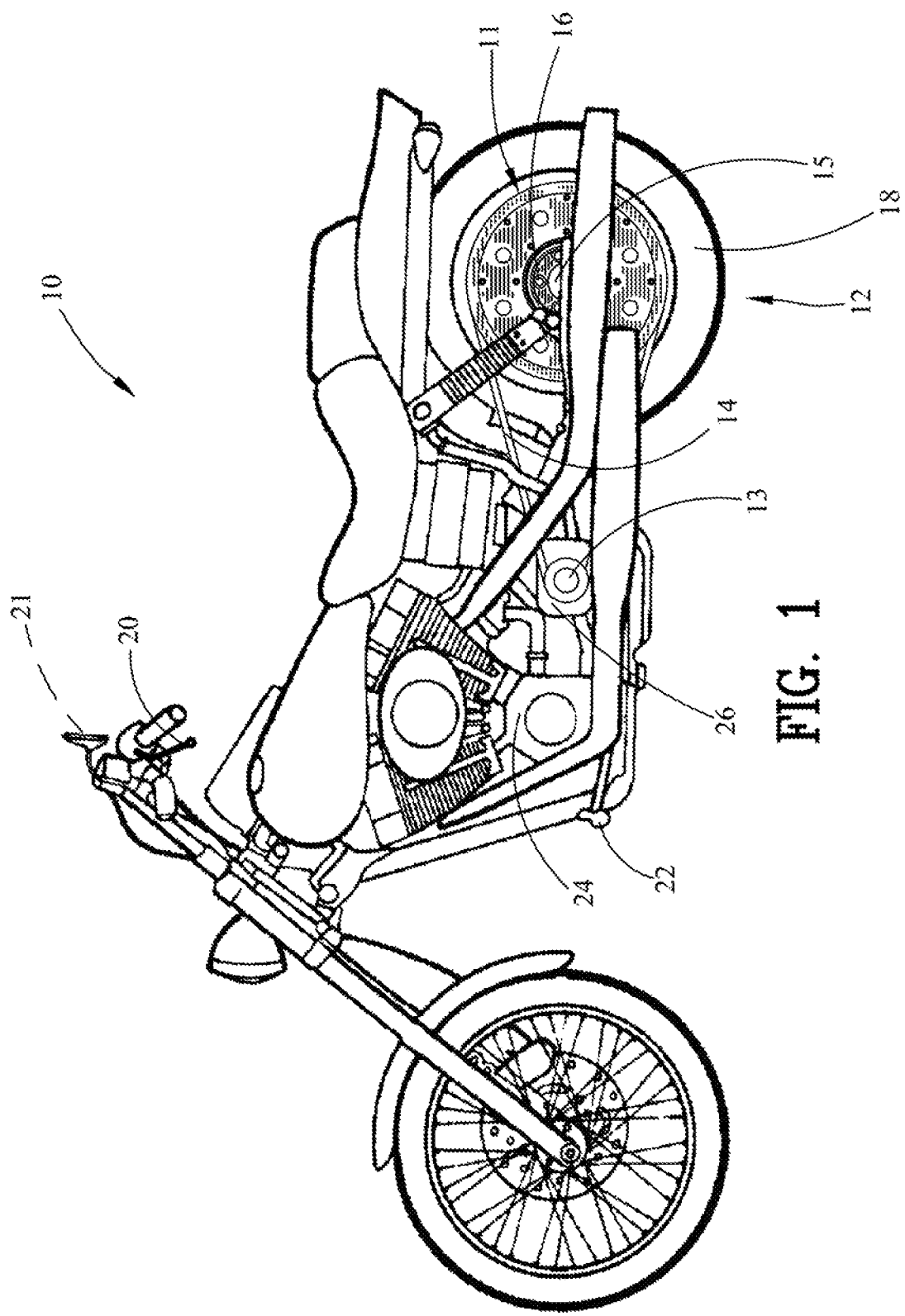
FIG. 1 is a distant view of the present invention mounted to rear wheel drive motorcycle.

FIG. 1 is a distant view of the present invention, the Uni-Drive Pulley 11, mounted to the rear wheel 12 of a motorcycle 10. FIG. 1 also shows the rear wheel 12, the engine pulley 13, a flexible drive belt 14, the clutch handle 20 that operates the clutch, the throttle control 21 that controls the power and the Revolutions Per Minute (RPM) of the motorcycle's 10 engine 24, and the shifter 22 which selects the gear the transmission 26 is to operate.

Figure 2:
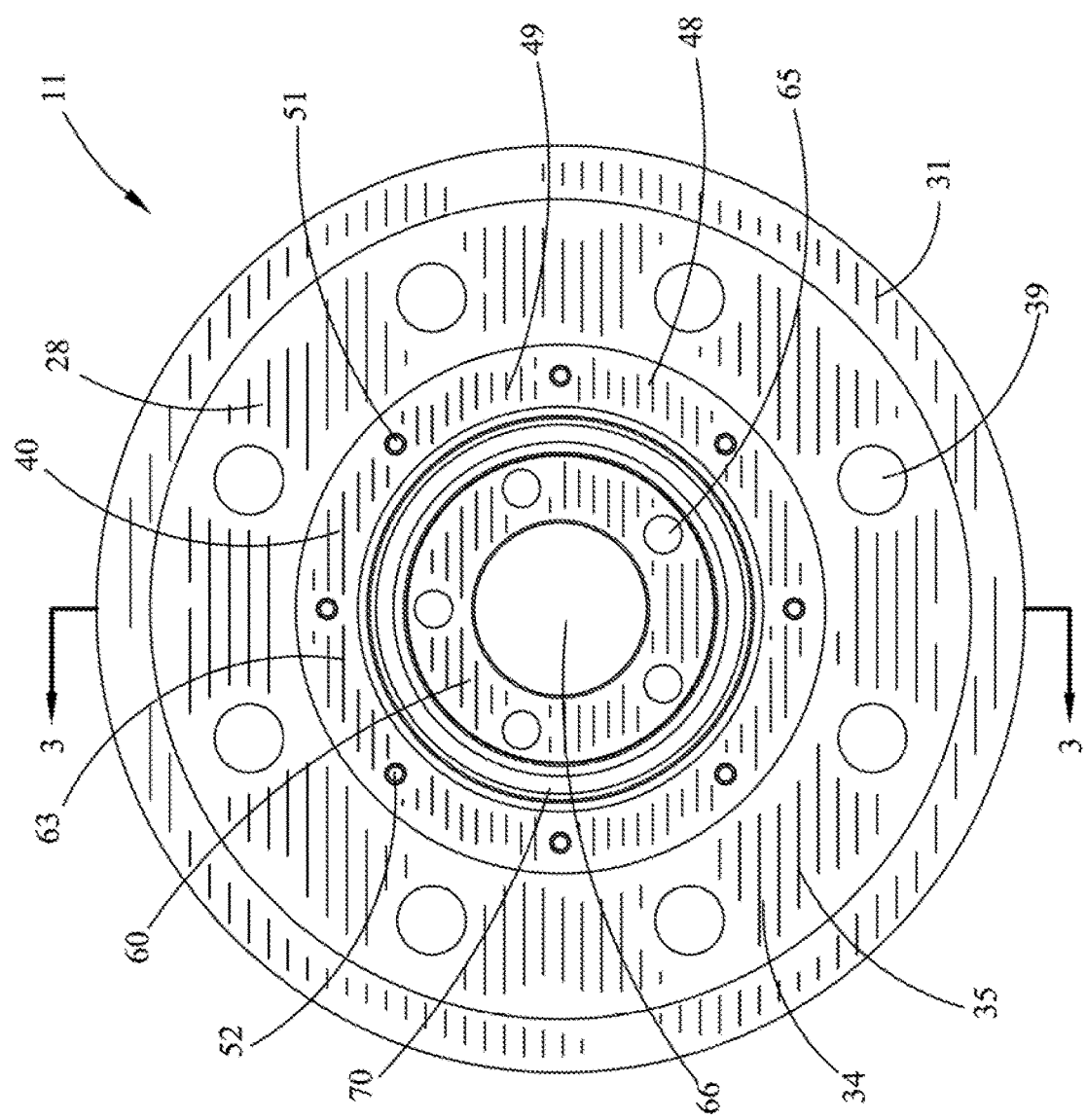
FIG. 2 is a close-up view of the present invention shown in FIG. 1 dismounted from motorcycle.

FIG. 2 is a close-up view of the Uni-Drive Pulley 11, shown in FIG. 1. FIG. 2 shows the Uni-Drive Pulley 11 dismounted from the rear wheel 12 of a motorcycle 10, but as an assembled Uni-Drive Pulley 11. The Uni-Drive Pulley 11 can be broken down into four main sections, the pulley ring 28, the outer hub 40, the inner hub 60, and the sprag clutch 90, shown later in FIG. 3, along with the first bearing 70 and second bearing 80 shown later in FIG. 3. FIG. 2 does not show the sprag clutch 90 nor the second bearing 80.

What is shown in FIG. 2 is the pulley ring 28 which is the outer section of the Uni-Drive Pulley 11 and has a first pulley ring side surface 31, the pulley ring wall 34, and the first pulley ring wall side surface 35.

In the center of the Uni-Drive Pulley 11 is the outer hub 40. FIG. 2 shows the outer hub 40 having an outer hub wall 48, a first outer hub wall side surface 49, and a plurality of outer hub wall apertures 51. FIG. 2 lastly shows the first bearing 70 being between the outer hub 40 and the inner hub 60.

In the inner portion of the Uni-Drive Pulley 11 is the inner hub 60. FIG. 2 shows the inner hub 60 having a first inner hub side surface 63, a plurality of mounting apertures 65, and a center inner hub aperture 66. Details of the four main sections will be described in more detail later herein.

Figure 3:
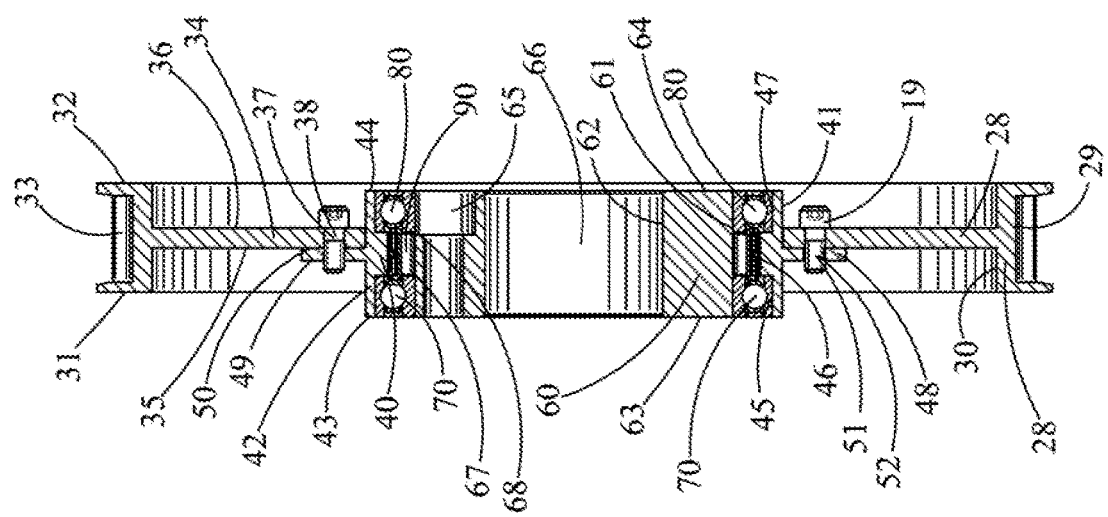
FIG. 3 is a sectional view along line 3-3 in FIG. 2.

FIG. 3 is a sectional view along line 3-3 in FIG. 2. FIG. 3 shows all the main sections in better detail of the Uni-Drive Pulley 11 including the forth main section not fully shown in FIG. 2. Shown better here, the last main section includes the sprag clutch 90, the first bearing 70 and the second bearing 80. FIG. 3 also shows the pulley ring 28, the outer hub 40, and the inner hub 60 in better detail.

First, FIG. 3 shows the pulley ring 28, which includes the exterior pulley ring surface 29, the interior pulley ring surface 30, the first pulley ring side surface 31, the second pulley ring side surface 32, the plurality of pulley teeth 33, the pulley ring wall 34, the first pulley ring wall side surface 35, and the second pulley ring wall side surface 36. The exterior pulley ring surface 29 contains the plurality of pulley teeth 33 that extend outwardly for gripping the flexible drive belt 14. The pulley ring wall 34 that is affixed to and extending inwardly and perpendicularly to the interior pulley ring surface 30. The first pulley ring side surface 31 and the second pulley ring side surface 32 extends outwardly and beyond the pulley teeth 33 for maintaining the flexible drive belt 14 on top of the pulley teeth 33.

Next, FIG. 3 shows the outer hub 40 which includes the exterior outer hub surface 41, the interior outer hub surface 42, the first outer hub side surface 43, and the second outer hub side surface 44. The exterior outer hub surface 41 contains an outer hub wall 48 which includes the first outer hub wall side surface 49, and the second outer hub wall side surface 50. The interior outer hub surface 42 includes a first interior outer hub face 45, the second interior outer hub face 46, and the third interior outer hub face 47. The outer hub wall 48 is affixed to and extends outwardly and perpendicularly to the exterior outer hub surface 41 for fastening the outer hub wall 48 to the pulley ring wall 34. Here it should be mentioned that the pulley ring wall 34 can extend inwardly further than the outer hub wall 48 extends outwardly for making the connection more towards the center of the Uni-Drive Pulley 11, or outer hub wall 48 can extend outwardly further than the pulley ring wall 34 extends inwardly for making the connection more towards the outer ring of the Uni-Drive Pulley 11. Additionally, the connection maybe made in a few different ways. First the pulley ring wall 34 and the outer hub wall 48 may have a plurality of pulley ring wall apertures 37 and outer hub wall apertures 51, respectively, for joining the pulley ring wall 34 to the outer hub wall 51 by means of nuts and bolts. Another method to attachment could be the pulley ring wall 34 contains pulley ring wall threaded apertures 38 for fastening the pulley ring wall 34 to the outer hub wall 48 by means of bolts 19. Yet another method to attachment is where the outer hub wall 48 contains threaded apertures 52 for fastening the pulley ring wall 34 to the outer hub wall 48 by means of bolts 19. Finally, another method to attachment is where the pulley ring wall 34 and the outer hub wall 48 may be fastened by means of a weld.

Then FIG. 3 shows the inner hub 60 which includes the exterior inner hub surface 61, the interior inner hub surface 62, the first inner hub side surface 63, the second inner hub side surface 64, one of the plurality of mounting apertures 65, the center inner hub aperture 66, the first exterior inner hub surface curb 67, and the second exterior inner hub surface curb 68. The first exterior inner hub surface curb 67, and the second exterior inner hub surface curb 68 are best shown later in FIG. 9 and FIG. 10. The center inner hub aperture 66 allows the inner hub 60 to encompass the rear axle 15 shown in FIG. 1. The plurality of mounting apertures 65 extends from the second inner hub side surface 64 to the first inner hub side surface 63 for the passage of a lug bolt 16 to secure the inner hub 60 to the rear wheel 12 shown in FIG. 1.

It is best to mention here that the first exterior inner hub surface curb 67 and the second exterior inner hub surface curb 68 are to help but are not required for the present invention, the Uni-Drive Pulley 11, to maintain alignment of the inner hub 60 to the outer hub 40. The first exterior inner hub surface curb 67 and the second exterior inner hub surface curb 68 also help but are not required to maintain spacing between the first bearing 70 from the sprag clutch 90, and spacing between the sprag clutch 90 from the second bearing 80. For example, the first bearing 70 and the second bearing 80 may be both press fitted between the outer hub 40 and inner hub 60 to maintain alignment of the inner hub 60 with the outer hub 40. Having the first bearing 70 and the second bearing 80 press fitted between the outer hub 40 and inner hub 60 will also maintain the spacing between first bearing 70 and the sprag clutch 90, and spacing between the sprag clutch 90 and the second bearing 80.

Finally, FIG. 3 shows the sprag clutch 90, the first bearing 70 and the second bearing 80. The sprag clutch 90 is located between the first bearing 70 and the second bearing 80, and between the exterior inner hub surface 61 and the second interior outer hub face 46. The first bearing 70 and the second bearing 80 allow for an almost frictionless rotation of the outer hub 40 about the inner hub 60. The first bearing 70 is preferably between the exterior inner hub surface 61 and the first interior outer hub face 45. The second bearing 80 is preferably between the exterior inner hub surface 61 and the third interior outer hub face 47

The sprag clutch 90 allows the outer hub 40 to rotate about the inner hub 60 in only one direction. It is important to point out here the complete function of the sprag clutch 90. The sprag clutch 90 allows the outer hub 40 to rotate about the inner hub 60 in only one direction so the when the operator of the motorcycle 10 reduces the power to the motorcycle's 10 engine 24 and the operator does not disengage the clutch by squeezing the clutch handle 20, the inner hub 60, which is connected to the rear wheel 12 wants to spin faster than the outer hub 40, which is connected to the engine 24 via the pulley ring 28 then the flexible Drive Belt 14 to the engine pulley 13. However, once the operator of the motorcycle 10 increases the power to the motorcycle's 10 engine 24 the torque direction changes, wherein the engine pulley 13 wants to spin faster than the rear wheel 12 the sprag clutch 90 engages and prevents the outer hub 40 from spinning faster than the inner hub 60. At this point the operator of the motorcycle 10 is accelerating and the outer hub 40 and inner hub 60 are spinning at the same speed. The benefits of this reaction caused by the sprag clutch 90 is that it allows the operator to shift gears without disengage the clutch by squeezing the clutch handle 21. It is also convenient to point out here that the sprag clutch 90 reaction improves safety to the rider in the event the engine seizes or the operator choose a gear that is too low for the current speed of the motorcycle 10, all of which could cause the rear wheel 12 to lock then cause the operator to lose control of the motorcycle 10 by breaking traction between the tire 18 and on the road surface. Finally, in FIG. 3, it is shown that the first pulley ring wall side surface 35 is connected to the second outer hub wall side surface 50. This configuration can be changed so that the second pulley ring wall side surface 36 is connected to the first outer hub wall side surface 49 to aid in aligning the pulley ring 28 to the engine pulley 13 when different makes and model motorcycles are encountered.

FIG. 4 through FIG. 13 shows the Uni-Drive Pulley 11 in the individual parts. FIG. 4 shows the pulley ring 28 similar to what is shown in FIG. 2, however, FIG. 4 shows the pulley ring wall apertures 37 which are covered in FIG. 2 by the outer hub wall 48.

FIG. 4 also shows a plurality of pulley ring radial apertures 39. It should be noted that the pulley ring radial apertures 39 are not required for the function of the Uni-Drive Pulley 11, they are only cosmetic, which could include many different design, and may also help to reduce overall weight.

FIG. 5 is a sectional view along line 5-5 in FIG. 4. FIG. 5 shows the pulley ring 28 and better shows the exterior pulley ring surface 29, the interior pulley ring surface 30, the first pulley ring side surface 31, the second pulley ring side surface 32, the plurality of pulley teeth 33, the pulley ring wall 34, the first pulley ring wall side surface 35, and the second pulley ring wall side surface 36.

FIG. 6. is a side view of the outer hub 40 similar to what is shown in FIG. 2 but better shows the first interior outer hub face 45 and the second interior outer hub face 46 which was hidden by the first bearing 70.

FIG. 7 is a sectional view along line 7-7 in FIG. 6. FIG. 7 better shows the exterior outer hub surface 41, the interior outer hub surface 42, the first outer hub side surface 43, the second outer hub side surface 44, the first interior outer hub face 45, the second interior outer hub face 46, the third interior outer hub face 47, the outer hub wall 48, the first outer hub wall side surface 49, and the second outer hub wall side surface 50.

Figure 8:
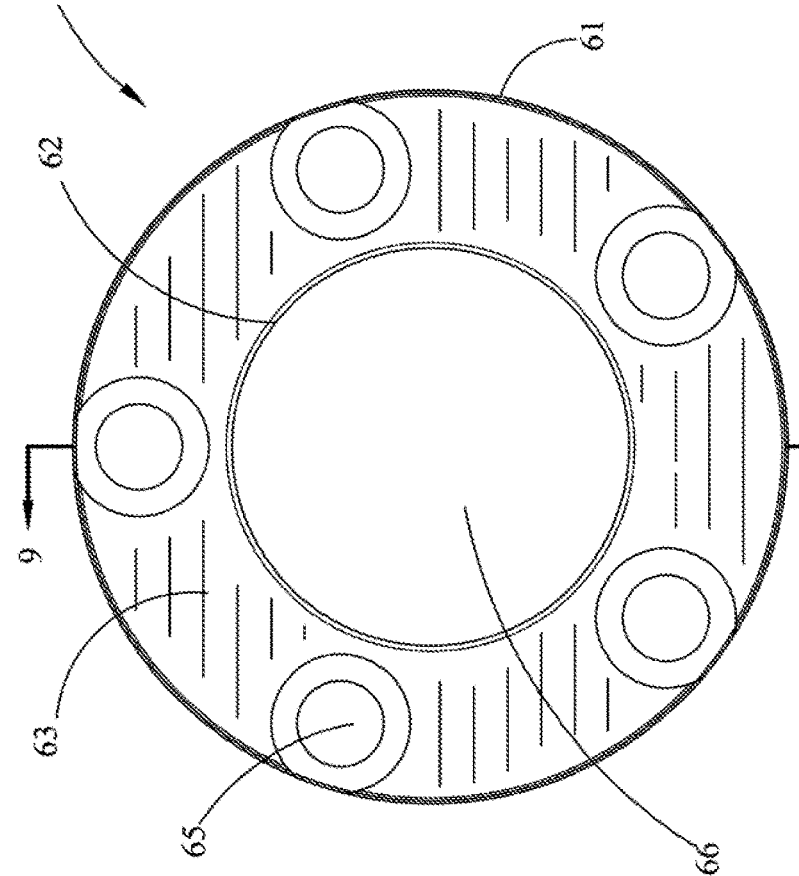
FIG. 8 is a side view of the inner pulley.

FIG. 8 is a side view of the inner hub 60 similar to what is shown in FIG. 2.

Figure 9:
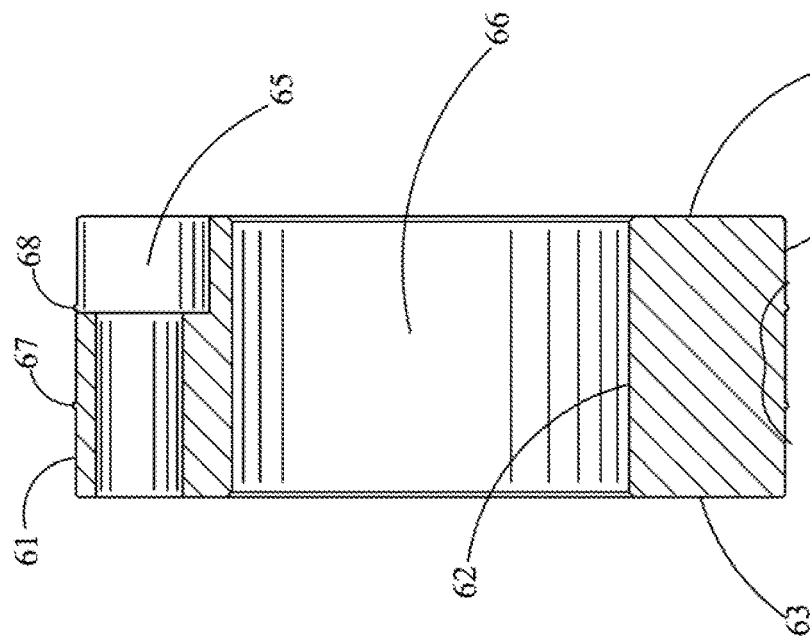
FIG. 9 is a sectional view along line 9-9 in FIG. 8.

FIG. 9 is a sectional view along line 9-9 in FIG. 8. FIG. 9 better shows the exterior inner hub surface 61, the interior inner hub surface 62, the first inner hub side surface 63, the second inner hub side surface 64, one of the plurality of mounting apertures 65, the center inner hub aperture 66, the first exterior inner hub surface curb 67, and the second exterior inner hub surface curb 68.

Figure 10:
FIG. 10 is an enlarged view of the exterior outer hub surface shown at the bottom in FIG. 9 showing the first exterior inner hub surface curb and the second exterior inner hub surface curb in better detail.

FIG. 10 is an exploded view of the lower portion of FIG. 9. FIG. 10 better shows he first exterior inner hub surface curb 67, and the second exterior inner hub surface curb 68.

Figure 11:
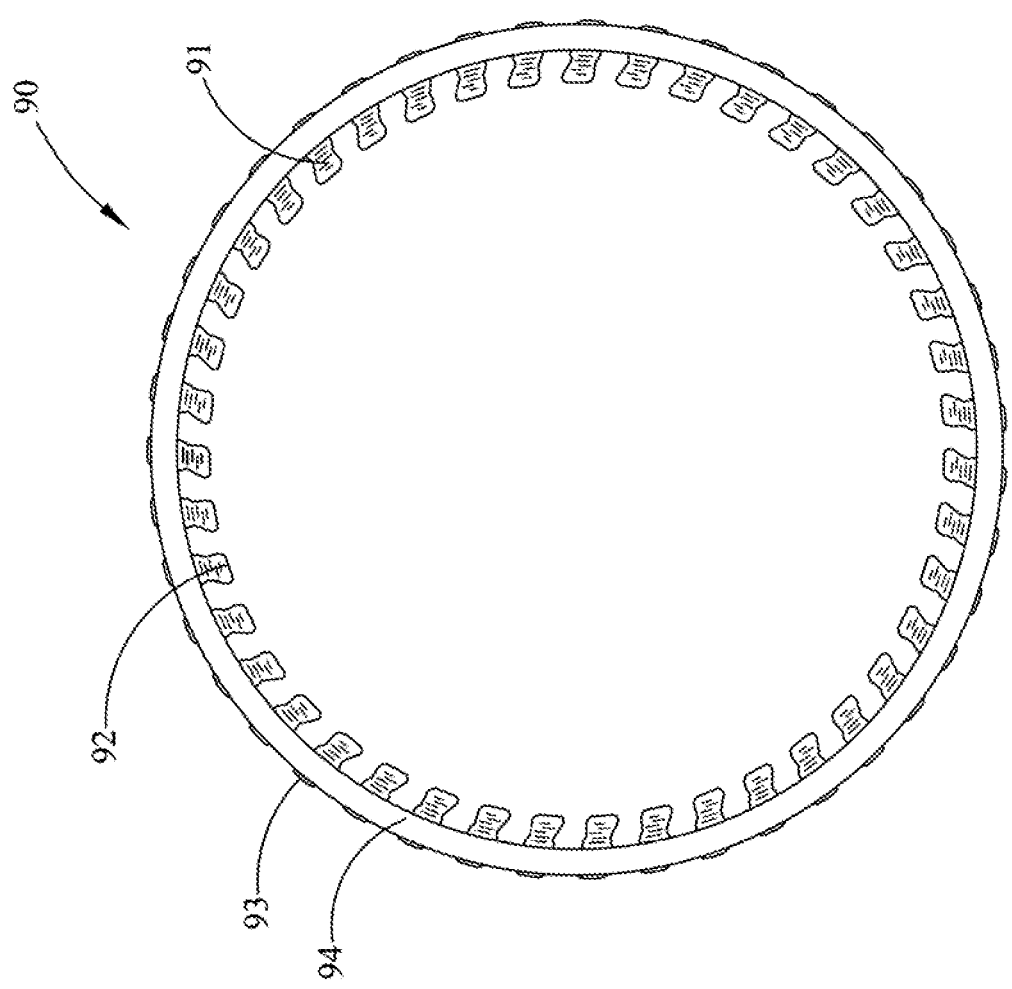
FIG. 11 is a side of the sprag clutch.

FIG. 11 is a side view of the sprag clutch 90, which was shown in FIG. 3. FIG. 11 shows the sprag clutch teeth 91, the sprag clutch inside diameter surface 92, the sprag clutch outside diameter surface 93, the first sprag clutch side surface 94.

Figure 12:
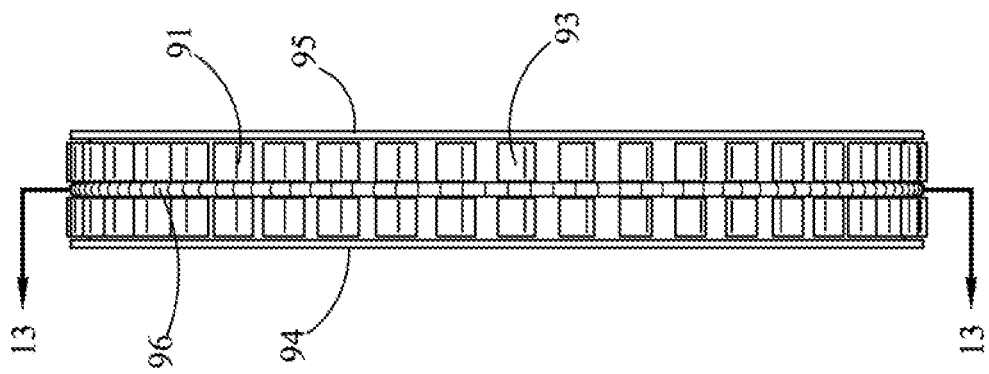
FIG. 12 is a front view of the sprag clutch.

FIG. 12 is a front view of the sprag clutch 90. FIG. 12 better shows the first sprag clutch side surface 94, and shows the second sprag clutch side surface 95, and the sprag clutch spring 96.

Figure 13:
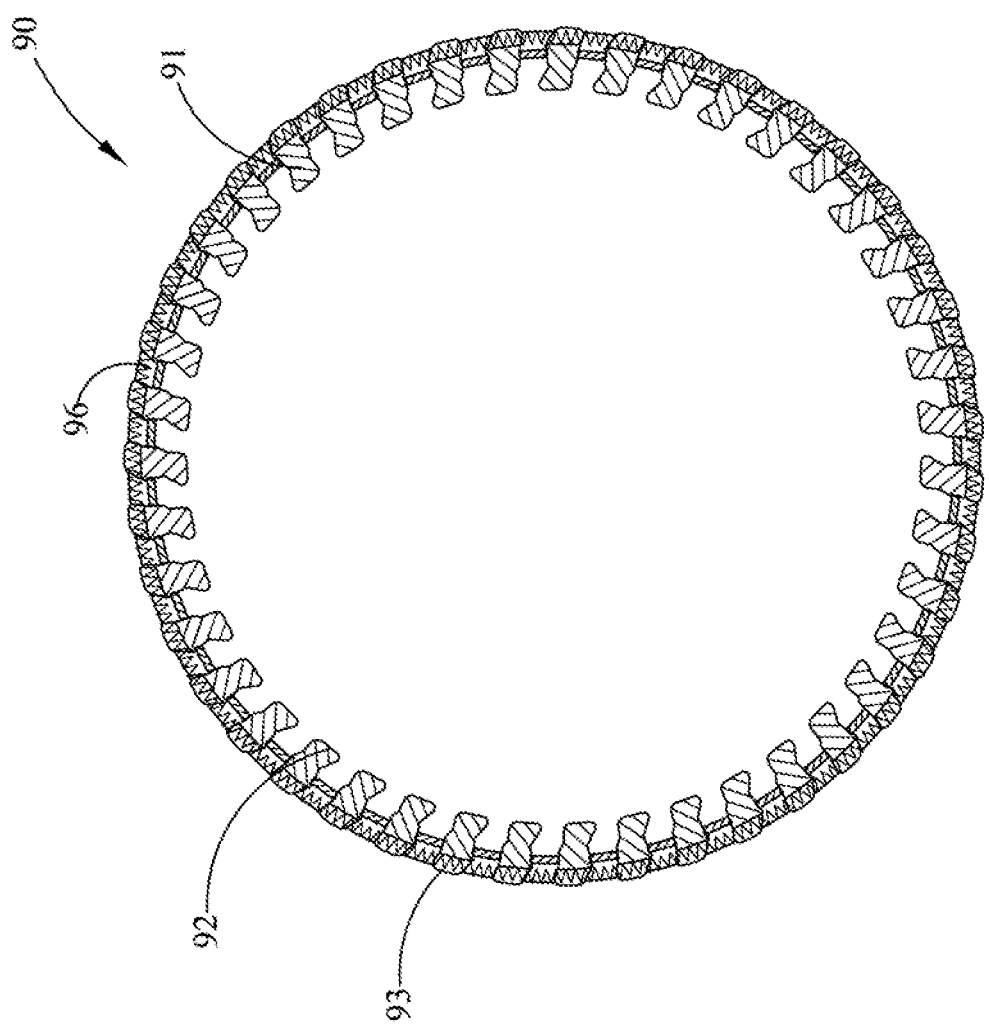
FIG. 13 is a sectional view along line 13-13 in FIG. 12.

FIG. 13 is a sectional view along line 13-13 in FIG. 12. FIG. 13 shows that the sprag clutch spring 96 exerts an inward force on the sprag clutch teeth 91 so that the sprag clutch teeth 91 will stay aligned and have continuous pressure and friction on the exterior inner hub surface 61. Here is can be seen that in the sprag clutch's 90 orientation, the sprag clutch 90 will only allow the inner hub 60 to spin in a counter-clockwise direction if the sprag clutch 90 is held stationary by the outer hub 40. Likewise, if the inner hub 60 is held stationary, the sprag clutch 90 will only allow the outer hub 40 to spin in a clockwise direction.

Figure 14:
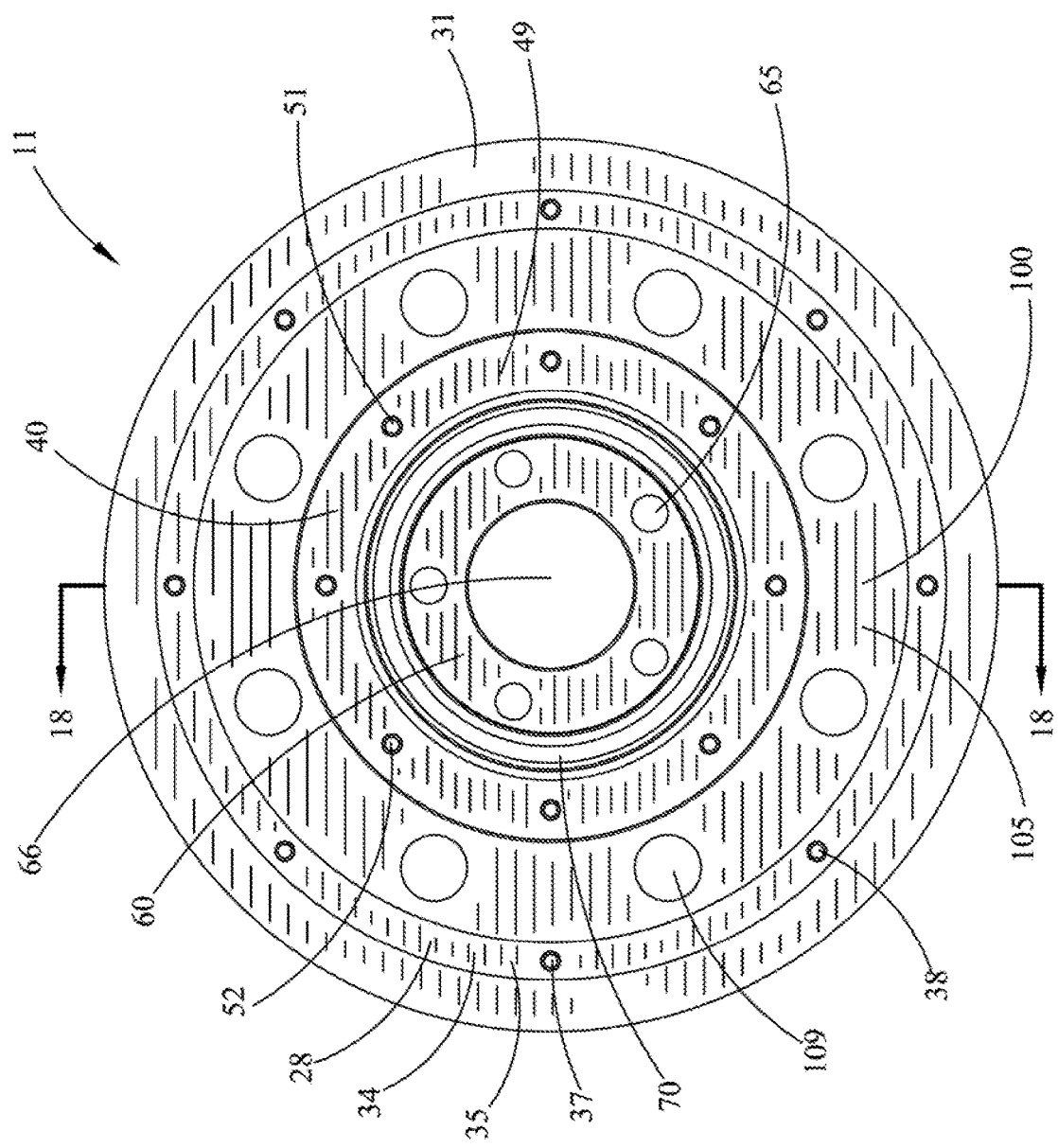
FIG. 14 is the first side view of the second embodiment showing the improved rear pulley with a rear pulley plate.

FIG. 14 shows a second embodiment of the Uni-Drive Pulley 11. In the second embodiment, there are five main sections of the Uni-Drive Pulley 11. To recap on the already referenced four main sections was the pulley ring 28, the outer hub 40, the inner hub 60, and the sprag clutch 90 along with the first bearing 70 and the second bearing 80.

The second embodiment adds a wheel plate 100 that interposes the pulley ring 28, and the outer hub 40.

Figure 15:
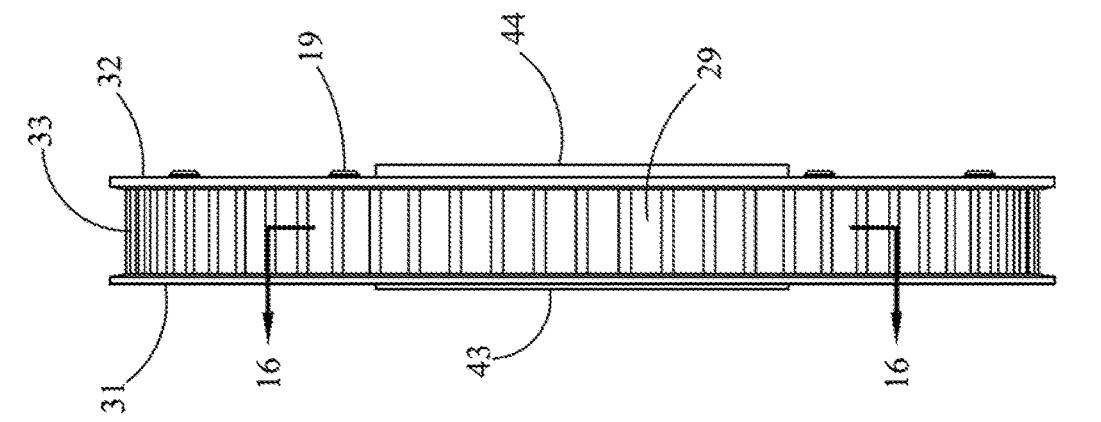
FIG. 15 is a front view of the second embodiment.

FIG. 15 is a front view of the second embodiment of the Uni-Drive Pulley 1. FIG. 15 shows exterior pulley ring surface 29, the first pulley ring side surface 31, the second pulley ring side surface 32, and the plurality of pulley teeth 33.

Figure 16:
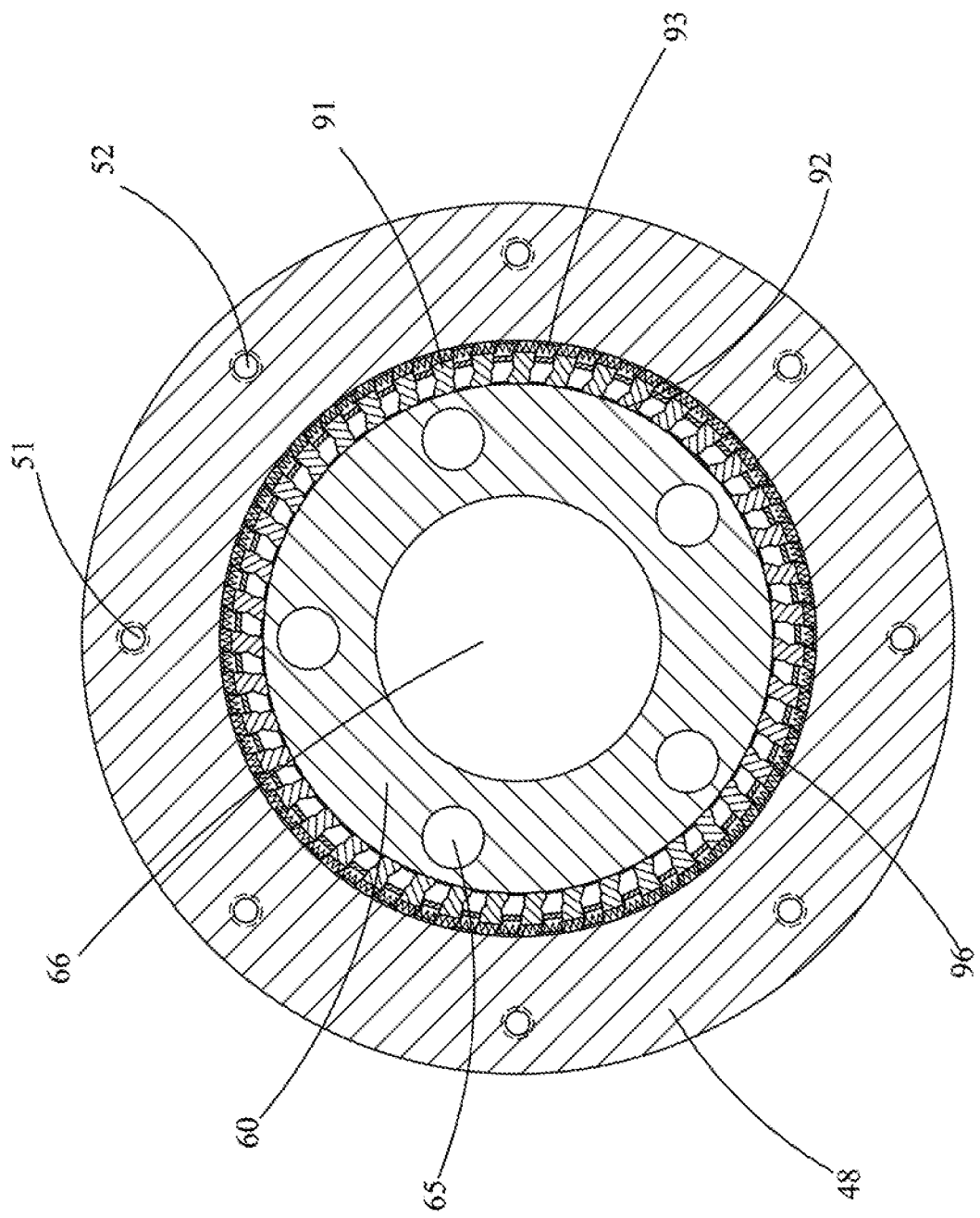
FIG. 16 is a sectional view along line 16-16 in FIG. 15.

FIG. 16 is a sectional view along line 16-16 in FIG. 15. In FIG. 16, the sprag clutch 90 is shown and the function of the sprag clutch 90 can be better explained. The current orientation of the sprag clutch 90 will allow the inner hub 60 to spin counter-clockwise without a turning force to the outer hub 40. It should be noted here that the orientation of sprag clutch 90 can be reversed so that the inner hub 60 can spin clockwise without a turning force to the outer hub 40. This is useful for applications where the Uni-Drive Pulley 11 needs to be installed on the opposite side of the motorcycle 10. Referring back to FIG. 1, the Uni-Drive Pulley 11 can be observed to be behind the operator's left leg would be positioned. However, some manufactures of motorcycles have the engine pulley 13 behind the operator's right leg would be positioned. If the manufacture puts the engine pulley 13 behind the operator's right leg would be positioned, the sprag clutch 90 would be reversed from what is shown in FIG. 16.

FIG. 17 shows the reverse side of FIG. 14 of the second embodiment. In FIG. 17 the second pulley ring side surface 32, the second inner hub side surface 64, and the second plate side surface 106 are visible.

FIG. 18 is a sectional view along line 18-18 in FIG. 14. FIG. 18 is very similar to FIG. 3 except with the addition of the wheel plate 100 within the second embodiment. FIG. 18 better shows the exterior wheel plate end 101, the interior wheel plate end 103, the first plate side surface 105, and the second plate side surface 106. It is convenient here to point out that in the drawings the exterior wheel plate end 101 and the interior wheel plate end 103 are roughly the same thickness. This will be further explained and shown later in FIG. 23 to FIG. 25.

It should be noted here that the wheel plate 100 may be mounted to the pulley ring wall 34 and to the outer hub wall 48 by different means. First the pulley ring wall 34 may contain pulley ring wall threaded apertures 38 for fastening the pulley ring wall 34 to the exterior wheel plate end 101 by means of bolts 19. The outer hub wall 48 may contain outer hub wall threaded apertures 52 for fastening the outer hub wall 48 to the interior wheel plate end 103 by means of bolts 19. The pulley ring wall 34 may contain pulley ring wall apertures 37 and the exterior wheel plate end 101 may contain exterior wheel plate end apertures 102 to allow the pulley ring wall 34 to be fastened to the exterior wheel plate end 101 by means of nuts and bolts. The outer hub wall 48 may contain outer hub wall apertures 51 and the interior wheel plate end 103 may contain interior wheel plate end apertures 104 to allow the interior wheel plate end 103 to be fastened to the outer hub wall 48 by means of nuts and bolts. Finally, the pulley ring wall 34 may by fastened to the exterior wheel plate end 101 and the outer hub wall 48 may be fastened to the interior wheel plate end 103 by means of a weld.

Figure 19:
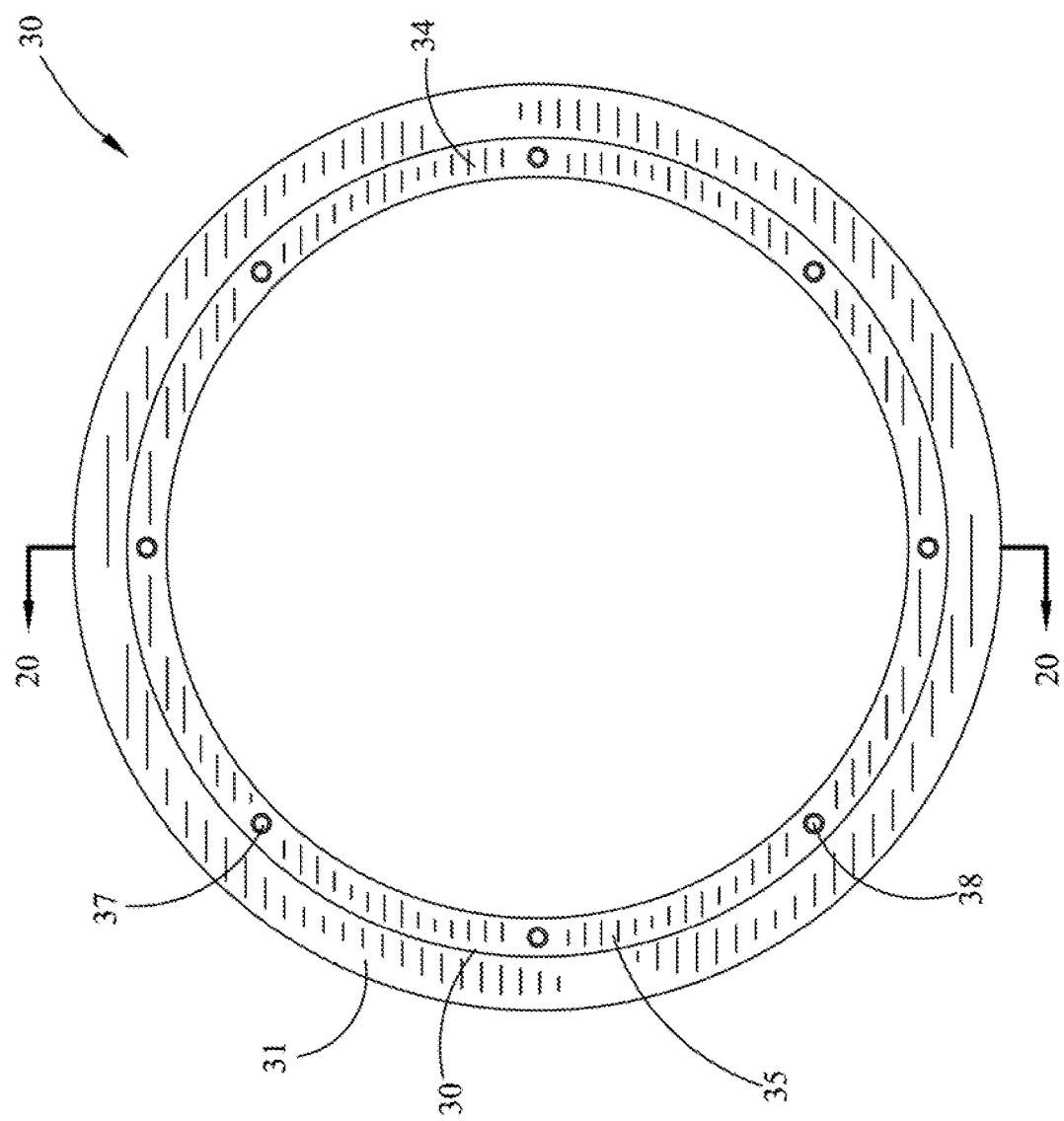
FIG. 19 is a side view of the rear pulley ring shown in FIG. 14 and FIG. 17.

FIG. 19 is similar FIG. 4 except that the FIG. 19 shows the pulley ring wall 34 is reduced in the length, whereas the pulley ring wall 34 extends inwardly and perpendicularly only enough from the interior pulley ring surface 30 to compensate for the wheel plate 100.

Figure 20:
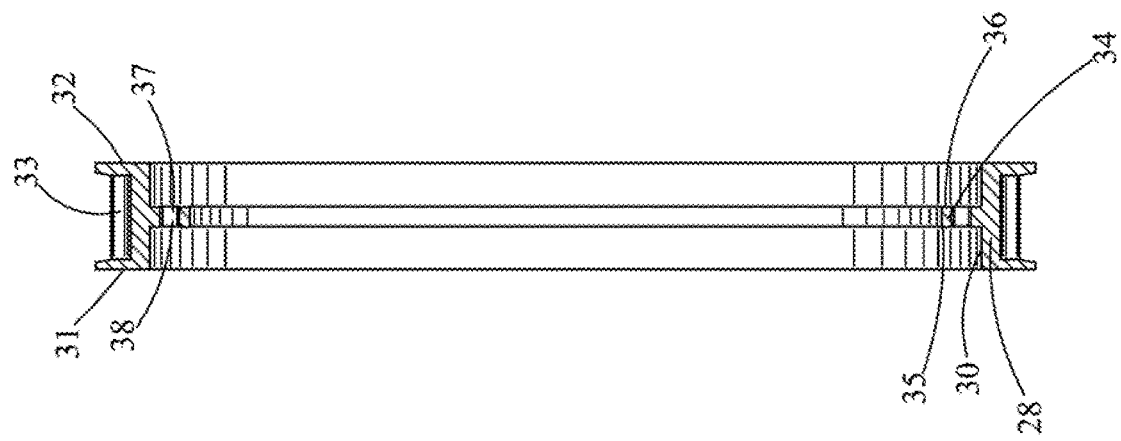
FIG. 20 is a sectional view along line 20-20 in FIG. 19.

FIG. 20 is similar FIG. 4 except that the FIG. 20 again shows pulley ring wall 34 reduced in the length to compensate for the wheel plate 100.

FIG. 21 shows a side view of the wheel plate 100. FIG. 21 shows the first plate side surface 105, exterior wheel plate end 101 and the interior wheel plate end 103, the wheel plate outer mounting fasteners 110, and the wheel plate inner mounting fasteners 111. FIG. 21 also shows a plurality of wheel plate apertures 109. It should be noted that the wheel plate apertures 109 are not required for the function of the Uni-Drive Pulley 11, they are only cosmetic or used to reduce weight.

FIG. 22 is a sectional view along line 22-22 in FIG. 21. FIG. 22 shows the wheel plate 100 and better shows the exterior wheel plate end 101, the exterior wheel plate end apertures 102, the interior wheel plate end 103, the interior wheel plate end apertures 104, the first plate side surface 105, and the second plate side surface 106. The exterior wheel plate end 101 has a plurality of wheel plate outer mounting fasteners 110 for fastening the exterior wheel plate end 101 to the pulley ring wall 34. The interior wheel plate end 103 has a plurality of wheel plate inner mounting fasteners 111 for fastening the interior wheel plate end 103 to the outer hub wall 48.

Figure 25:
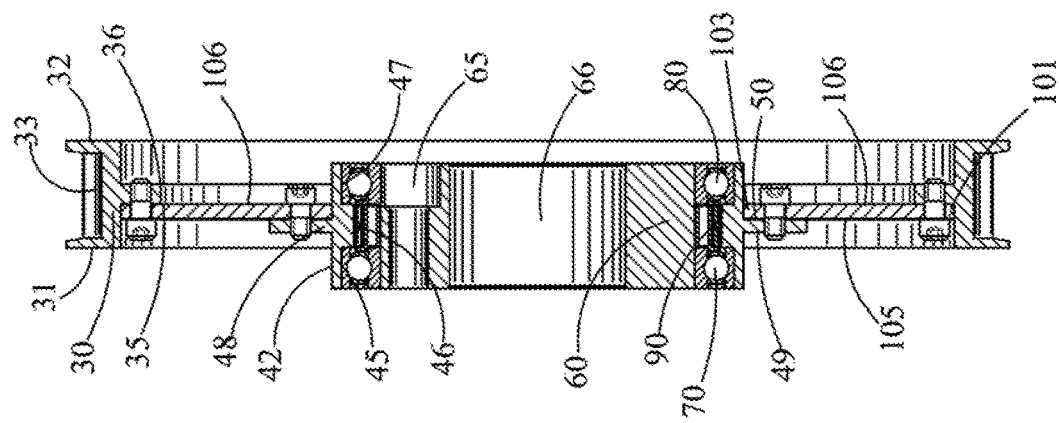
FIG. 25 is a sectional view similar to FIG. 18 wherein the exterior wheel plate end is bolted on the first side of the pulley ring wall and the interior wheel plate end is bolted to the second side of the outer hub wall to aid in offsetting the improved rear pulley to line up the pulley ring to the engine driven pulley.
Figure 24:
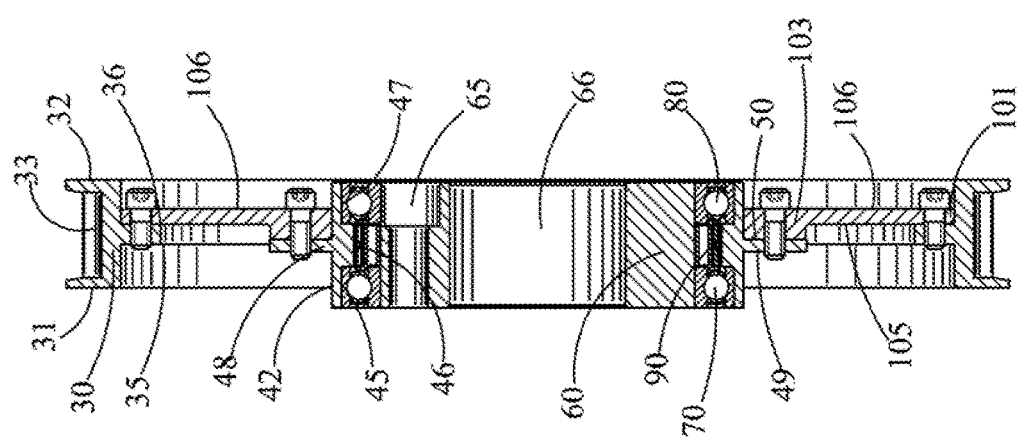
FIG. 24 is a sectional view similar to FIG. 18 wherein the interior wheel plate end is enlarged to aid in offsetting the improved rear pulley to line up the pulley ring to the engine driven pulley.
Figure 23:
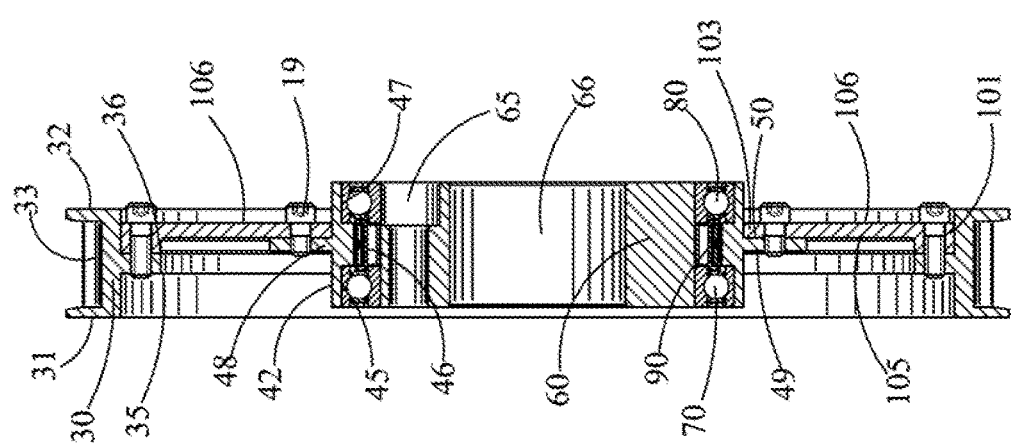
FIG. 23 is a sectional view similar to FIG. 18 wherein the exterior wheel plate end is enlarged to aid in offsetting the improved rear pulley to line up the pulley ring to the engine driven pulley.

FIG. 23 through FIG. 25 show various configuration the Uni-Drive Pulley 11 can be configured to align the Uni-Drive Pulley 11 with the engine pulley 13. In FIG. 23 it is shown that the exterior wheel plate end 101 can be sized for adjusting alignment of the pulley ring 28 to the engine pulley 13. In FIG. 24 it is shown that the interior wheel plate end 103 can be sized for adjusting alignment of the pulley ring 28 to the engine pulley 13. It should be understood that the size of the exterior wheel plate end 101 and the size of the interior wheel plate end 103 may vary together or independently. FIG. 25 shows how another possible configuration where the exterior wheel plate end 101 is fastened to the first pulley ring wall side surface 35 and the interior wheel plate end 103 is fastened to the second outer hub wall side surface 50.

With versatility of the Uni-Drive Pulley 11, the Uni-Drive Pulley 11 can be installed on a many different makes and models of motorcycles both past and current production motorcycles. The Uni-Drive Pulley 11 allows the operator to endure longer rides with improved safety.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A rear pulley for a rear wheel driven motor vehicle wherein the motor vehicle has an engine pulley, a flexible drive belt connecting engine pulley to and turning a rear pulley, the rear pulley is bolted to the rear wheel and the rear wheel is about a rear axle, the rear pulley comprising;
   a pulley ring having an exterior pulley ring surface, an interior pulley ring surface, a first pulley ring side surface and a second pulley ring side surface;
   said exterior pulley ring surface contains a plurality of pulley teeth extending outwardly for gripping the flexible drive belt;
   a pulley ring wall affixed to and extending inwardly and perpendicularly to said interior pulley ring surface;
   said pulley ring wall having a first pulley ring wall side surface and a second pulley ring wall side surface;
   said first pulley ring side surface and said second pulley ring side surface extend outwardly beyond said pulley teeth for maintaining the flexible drive belt on top of said pulley teeth;
   an outer hub having an exterior outer hub surface, an interior outer hub surface, a first outer hub side surface and a second outer hub side surface;
   said interior outer hub surface having a first interior outer hub face, a second interior outer hub face and a third interior outer hub face;
   an outer hub wall affixed to and extending outwardly and perpendicularly to said exterior outer hub surface for fastening said outer hub wall to said pulley ring wall;
   said outer hub wall having a first outer hub wall side surface and a second outer hub wall side surface;
   an inner hub having an exterior inner hub surface, an interior inner hub surface, a first inner hub side surface and a second inner hub side surface;
   a center inner hub aperture in said inner hub for encompassing the rear axle;
   a plurality of mounting apertures extending from said first inner hub side surface to said second inner hub side surface for the passage of a bolt to secure said inner hub to the wheel;
   a first bearing and a second bearing being between said outer hub and said inner hub for allowing rotation of said outer hub about said inner hub; and
   a sprag clutch being between said second interior outer hub face and said exterior inner hub surface for allowing one directional rotation of said outer hub about said inner hub.

2. The rear pulley for a rear wheel driven motor vehicle as set forth in claim 1, wherein said pulley ring wall and said outer hub wall having a plurality of pulley ring wall apertures and outer hub wall apertures, respectively, for joining said pulley ring wall to said outer hub wall by means of nuts and bolts.

3. The rear pulley for a rear wheel driven motor vehicle as set forth in claim 1, wherein said pulley ring wall contain pulley ring wall threaded apertures for fastening said pulley ring wall to said outer hub wall by means of bolts.

4. The rear pulley for a rear wheel driven motor vehicle as set forth in claim 1, wherein said outer hub wall contain threaded apertures for fastening said pulley ring wall to said outer hub wall by means of bolts.

5. The rear pulley for a rear wheel driven motor vehicle as set forth in claim 1, wherein said pulley ring wall and said outer hub wall are fastened by means of a weld.

6. The rear pulley for a rear wheel driven motor vehicle as set forth in claim 1, wherein said pulley ring wall extends inwardly further then said outer hub wall extends outwardly.

7. The rear pulley for a rear wheel driven motor vehicle as set forth in claim 1, wherein said exterior inner hub surface having a first exterior inner hub surface curb and a second exterior inner hub surface curb for maintaining spacing between said first bearing and said sprag, and spacing between said sprag from said second bearing, respectively.

8. A rear pulley for a rear wheel driven motor vehicle wherein the motor vehicle has an engine pulley, a flexible drive belt connecting engine pulley to and turning a rear pulley, the rear pulley is bolted to the rear wheel and the rear wheel is about a rear axle, the rear pulley comprising;
- a pulley ring having an exterior pulley ring surface, an interior pulley ring surface, a first pulley ring side surface and a second pulley ring side surface;
- said exterior pulley ring surface contains a plurality of pulley teeth extending outwardly for gripping the flexible drive belt;
- a pulley ring wall affixed to and extending inwardly and perpendicularly to said interior pulley ring surface;
- said pulley ring wall having a first pulley ring wall side surface and a second pulley ring wall side surface;
- said first pulley ring side surface and said second pulley ring side surface extend outwardly beyond said pulley teeth for maintaining the flexible drive belt on top of said pulley teeth;
- an outer hub having an exterior outer hub surface, an interior outer hub surface, a first outer hub side surface and a second outer hub side surface;
- said interior outer hub surface having a first interior outer hub face, a second interior outer hub face and a third interior outer hub face;
- an outer hub wall affixed to and extending outwardly and perpendicularly to said exterior outer hub surface for fastening said outer hub wall to said pulley ring wall;
- said outer hub wall having a first outer hub wall side surface and a second outer hub wall side surface;
- said pulley ring wall extends inwardly further then said outer hub wall extends outwardly;
- an inner hub having an exterior inner hub surface, an interior inner hub surface, a first inner hub side surface and a second inner hub side surface;
- a center inner hub aperture in said inner hub for encompassing the rear axle;
- a plurality of mounting apertures extending from said first inner hub side surface to said second inner hub side surface for the passage of a bolt to secure said inner hub to the wheel;
- a first bearing and a second bearing being between said outer hub and said inner hub for allowing rotation of said outer hub about said inner hub;
- a sprag clutch being between said second interior outer hub face and said exterior inner hub surface for allowing one directional rotation of said outer hub about said inner hub; and
- said exterior inner hub surface having a first exterior inner hub surface curb and a second exterior inner hub surface curb for maintaining spacing between said first bearing and said sprag, and spacing between said sprag from said second bearing, respectively.

9. The rear pulley for a rear wheel driven motor vehicle as set forth in claim 8, wherein said pulley ring wall and said outer hub wall having a plurality of pulley ring wall apertures and outer hub wall apertures, respectively, for joining said pulley ring wall to said outer hub wall by means of nuts and bolts.

10. The rear pulley for a rear wheel driven motor vehicle as set forth in claim 8, wherein said pulley ring wall contain pulley ring wall threaded apertures for fastening said pulley ring wall to said outer hub wall by means of bolts.

11. The rear pulley for a rear wheel driven motor vehicle as set forth in claim 8, wherein said outer hub wall contain threaded apertures for fastening said pulley ring wall to said outer hub wall by means of bolts.

12. The rear pulley for a rear wheel driven motor vehicle as set forth in claim 8, wherein said pulley ring wall and said outer hub wall are fastened by means of a weld.

13. A rear pulley for a rear wheel driven motor vehicle wherein the motor vehicle has an engine pulley, a flexible drive belt connecting engine pulley to and turning a rear pulley, the rear pulley is bolted to the rear wheel and the rear wheel is about a rear axle, the rear pulley comprising;
- a pulley ring having an exterior pulley ring surface, an interior pulley ring surface, a first pulley ring side surface and a second pulley ring side surface;
- said exterior pulley ring surface contains a plurality of pulley teeth extending outwardly for gripping the drive belt;
- a pulley ring wall affixed to and extending inwardly and perpendicularly to said interior pulley ring surface;
- said pulley ring wall having a first pulley ring wall side surface and a second pulley ring wall side surface;
- said first pulley ring side surface and said second pulley ring side surface extend outwardly beyond said pulley teeth for maintaining the drive belt on top of said pulley teeth;
- a wheel plate having an exterior wheel plate end, an interior wheel plate end, a first wheel plate side surface and a second wheel plate side surface;
- a plurality of wheel plate mounting fasteners in said exterior wheel plate end for fastening said exterior wheel plate end to said inner pulley ring wall;
- an outer hub having an exterior outer hub surface, an interior outer hub surface, a first outer hub side surface and a second outer hub side surface;
- said interior outer hub surface having a first interior outer hub face, a second interior outer hub face and a third interior outer hub face;
- an outer hub wall affixed to and extending outwardly and perpendicularly to said exterior outer hub surface for fastening said outer hub wall to said pulley ring wall;
- said outer hub wall having a first outer hub wall side surface and a second outer hub wall side surface;
- a plurality of wheel plate mounting fasteners in said interior wheel plate end for fastening said interior wheel plate end to said outer hub wall;
- an inner hub having an exterior inner hub surface, an interior inner hub surface, a first inner hub side surface and a second inner hub side surface;
- a center inner hub aperture in said inner hub for encompassing the rear axle;
- a plurality of mounting apertures extending through said first inner hub side surface to said second inner hub side surface for the passage of a bolt to secure said inner hub to the wheel;
- a first bearing and a second bearing being between said outer hub and said inner hub for connecting and allowing rotation of said outer hub about said inner hub; and
- a sprag clutch being between said second interior outer hub face and said exterior inner hub surface for allowing one directional rotation of said outer hub about said inner hub.

14. The rear pulley for a rear wheel driven motor vehicle as set forth in claim 13, wherein said pulley ring wall contain pulley ring wall threaded apertures for fastening said pulley ring wall to said exterior wheel plate end by means of bolts.

15. The rear pulley for a rear wheel driven motor vehicle as set forth in claim 13, wherein said outer hub wall contain outer hub wall threaded apertures for fastening said outer hub wall to said interior wheel plate end by means of bolts.

16. The rear pulley for a rear wheel driven motor vehicle as set forth in claim 13, wherein said pulley ring wall and said exterior wheel plate end are fastened by means of nuts and bolts.

17. The rear pulley for a rear wheel driven motor vehicle as set forth in claim 13, wherein said outer hub wall and said interior wheel plate end are fastened by means of nuts and bolts.

18. The rear pulley for a rear wheel driven motor vehicle as set forth in claim 13, wherein said pulley ring wall and said outer hub wall are fastened by means of a weld.

19. The rear pulley for a rear wheel driven motor vehicle as set forth in claim 13, wherein said exterior inner hub surface having a first exterior inner hub surface curb and a second exterior inner hub surface curb for maintaining spacing between said first bearing and said sprag, and spacing between said sprag from said second bearing, respectively.

20. The rear pulley for a rear wheel driven motor vehicle as set forth in claim 13, wherein said exterior wheel plate end can be sized for adjusting alignment of said pulley ring to the engine pulley.

21. The rear pulley for a rear wheel driven motor vehicle as set forth in claim 13, wherein said interior wheel plate end can be sized for adjusting alignment of said pulley ring to the engine pulley.

\* \* \* \* \*